Oct. 10, 1967     A. L. CAMP     3,346,001

BACKFLOW PREVENTING VALVE

Filed May 4, 1965

INVENTOR.
ALFRED L. CAMP
BY Lyon & Lyon
ATTORNEYS

3,346,001
BACKFLOW PREVENTING VALVE
Alfred L. Camp, Brea, Calif., assignor to Irving Terry, Los Angeles, Calif.
Filed May 4, 1965, Ser. No. 453,042
4 Claims. (Cl. 137—218)

This invention relates to backflow preventing valves and included in the objects of this invention are:

First, to provide a backflow preventing valve which is particularly economical of manufacture to facilitate its use in many applications where more conventional backflow preventing valves have not been feasible.

Second, to provide a backflow preventing valve which comprises a pair of housing members easily molded of plastic material, and a yieldable valve element interposed therebetween.

Third, to provide in a backflow preventing valve a novelly constructed valve element formed of elastomeric material which not only performs the function of preventing backflow but also diverts or bleeds backflowing fluids.

With the above and other objects in view as may appear hereinafter, reference is directed to the accompanying drawings, in which.

Figure 1:
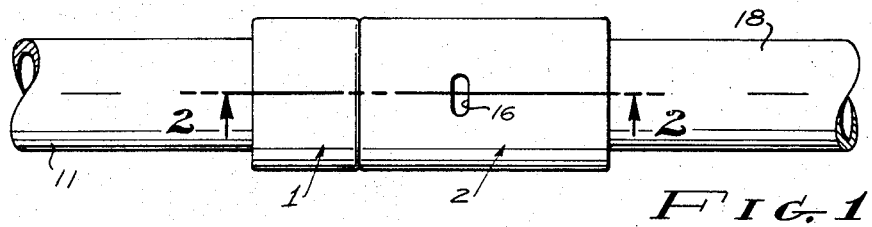
FIGURE 1 is a side view of the backflow preventing valve shown connected in a pipeline.

The backflow preventing valve comprises an inlet housing member 1, a coaxial outlet housing member 2 and a valve element 3.

The housing member 1 is provided with a reduced portion 4 at one end having a land of intermediate diameter provided with external screw threads 5. The reduced end of the housing member is closed to form a valve seat 6 having a ring of ports 7 and a central boss 8. Inward from the valve seat 6, the housing member is provided with a bore 9 which is enlarged at the end of the housing opposite from the valve seat and provided with internal screwthreads 10 for connection to a pipe 11.

The housing member 2 is provided with an outlet port 12. At the downstream end of the outlet port, the housing member 2 is enlarged to form a valve chamber 13 and is provided with internal screwthreads for connection with the external screwthreads 5.

The central walls of the valve chamber 13 form with the reduced portion 4 of the housing member 1, an annular axially directed channel 14. The counter bore forms a shoulder 15 at the downstream side of the outlet port 12 and between the shoulder 15 and channel 14, the valve chamber is provided with side ports 16. Upstream from the outlet port 12, the housing member is internally enlarged and provided with screwthreads 17 for connection to a pipe 18.

The valve element 3 is formed of rubber or other elastomer and is provided with a constricted bore 19, one end of which fits over the central boss 8. The valve element is provided with an annular sealing surface 20 at the downstream end of the constructed bore 19, which engages the valve seat 6 so as to close the ports 7.

Radially outward from and surrounding the sealing surface 20 is an annular axially directed lip 21 which extends into the axially directed channel 14. The outer surface of the lip 21 sealingly engages the central surface of the valve chamber 13.

The upstream side of the bore 19 flares outwardly and is joined to a base ring 22 which fits against the shoulder 15. The valve element is provided between the base ring 22 and lip 21 with an external annular channel 23 in radial alignment with the side ports 16. Ports 24 extend through the wall of the valve element between the channel 23 and the flared end of the bore 19.

Figure 2:
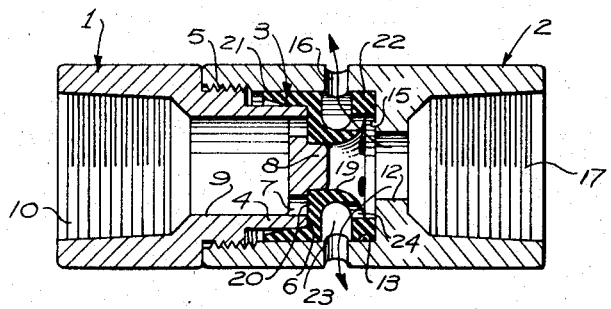
FIGURE 2 is an enlarged longitudinal sectional view of the backflow preventing valve, omitting the adjacent sections of the pipeline and showing the valve in its backflow preventing condition.
Figure 3:
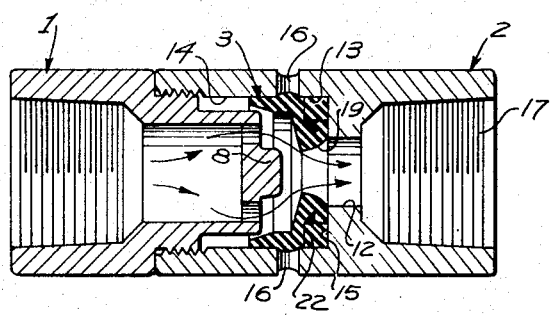
FIGURE 3 is a similar longitudinal sectional view showing the valve in its open position permitting flow from the normally downstream end to the upstream end of the valve.
Figure 4:
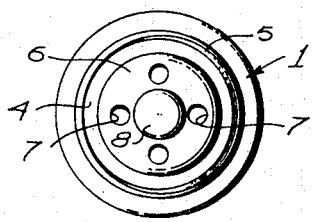
FIGURE 4 is an end view of the inlet housing member showing the valve seat.
Figure 5:
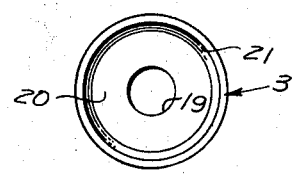
FIGURE 5 is an end view of the valve element showing the inlet side thereof.
Figure 6:
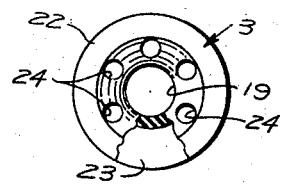
FIGURE 6 is an end view showing the outlet end of the valve element.

Operation of the backflow preventing valve is as follows:

The valve element, when in its free state occupies the position shown in FIGURE 2 in which the sealing surface 20 engages the valve seat 6 and the ports 24 and 16 communicate between the normally outlet side of the valve and the exterior of the valve. When the valve is subjected to fluid pressure originating in a region downstream from the valve seat 6, the valve element is compressed axially so that the annular sealing lip 21 closes the side ports 16 and the sealing surface 20 is spaced from the valve seat 6 so that flow may occur through the valve and continue upstream through the outlet port 12. In this condition, the annular channel 23 is crushed in that the upstream side of the annular lip 21 bears against the base ring 22 as shown in FIGURE 3.

Should a suction pressure exist downstream from the valve seat 6, the valve element returns to the position shown in FIGURE 2 so that fluid upstream from the valve cannot pass through the valve but is discharged from the side ports 16.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:
1. A backflow preventing valve, comprising:
 (a) a housing means defining an inlet having an inlet seat, a cylindrical valve chamber having lateral ports communicating said chamber with the atmosphere and an outlet;
 (b) and a tubular valve element extending between said inlet and said outlet; said valve element including ports communicating between said outlet and said lateral ports for backflowing fluid, a cylindrical seal means slidable along the cylindrical wall of said chamber, and an annular sealing surface on said cylindrical seal means engageable with said inlet seat in response to pressure of said backflowing fluid;
 (c) said valve element being axially compressible in response to fluid pressure at said inlet to establish communication from said inlet to said outlet and to cause said slidable seal means to close said lateral ports.
2. A backflow preventing valve, comprising:
 (a) a housing means defining an inlet having an inlet seat, a cylindrical valve chamber having lateral ports communicating said chamber with the atmosphere and an outlet;
 (b) and an annular valve element formed of elastomeric material and including an annular channel normally in registry with said lateral ports, backflow ports in its side walls communicating between said channel and a region adjacent said outlet port, a sealing cup having a sealing surface normally covering said inlet seat and a surrounding annular lip slidable along said cylindrical wall to close said channel and seal said lateral ports.

3. A backflow preventing valve, comprising:
(a) a coaxial inlet member and outlet member;
(b) separable means connecting said members;
(c) said members defining therebetween a cylindrical valve chamber having laterally directed back-flow discharge ports, said inlet member having a closed end pierced by a ring of inlet ports, said outlet member having a coaxial outlet port;
(d) and a valve element formed of an elastomeric material and defining an axial flow passage therethrough, an external annular channel normally in registry with said backflow discharge ports, and backflow ports communicating between said flow passage and said channel;
(e) said valve element having a sealing cup forming an annular sealing lip slidable along the cylindrical wall of said valve chamber to close said channel and seal said backflow discharge ports upon flow from said inlet to said outlet, and a surface within said lip for sealing said ring of inlet ports upon flow from said outlet to said inlet.

4. A backflow preventing valve, comprising:
(a) a coaxial inlet member and outlet member;
(b) separable means connecting said members;
(c) said members defining therebetween a cylindrical valve chamber having laterally directed backflow discharge ports, said inlet member having a closed end pierced by a ring of inlet ports and a central boss directed axially into said chamber, said outlet member having a coaxial outlet port;
(d) and a valve element formed of elastomeric material and defining an axial flow passage therethrough, an external channel normally in registry with said backflow discharge ports, and backflow ports communicating between said flow passage and said channel;
(e) said valve element having a sealing cup forming a wall of said channel and having an axially directed lip directed toward said inlet member and slidable along the cylindrical wall of said chamber to close said channel and seal said backflow discharge ports, and an annular surface within said lip for sealing said ring of inlet ports; said boss being received in the inlet end of said flow passage;
(f) said valve element being axially compressible in response to fluid pressure at said inlet ports to permit flow through said flow passage and through said outlet, and responsive to back pressure to close said inlet port and permit flow through said backflow ports, channel and backflow discharge ports.

References Cited
UNITED STATES PATENTS

| | | | |
|---|---|---|---|
| 2,646,063 | 7/1953 | Hayes | 137—512.4 X |
| 3,065,761 | 11/1962 | Peras | 137—512.4 X |

FOREIGN PATENTS

| | | |
|---|---|---|
| 1,091,498 | 10/1960 | Germany. |

WILLIAM F. O'DEA, *Primary Examiner.*

D. H. LAMBERT, *Assistant Examiner.*